(12) United States Patent
Tanaka et al.

(10) Patent No.: US 9,405,504 B2
(45) Date of Patent: Aug. 2, 2016

(54) INFORMATION COMMUNICATION TERMINAL AND DIALOGUE PRESENTATION METHOD

(71) Applicant: Panasonic Intellectual Property Management Co., Ltd., Osaka (JP)

(72) Inventors: Akira Tanaka, Osaka (JP); Toshiya Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/767,739

(22) PCT Filed: Mar. 10, 2014

(86) PCT No.: PCT/JP2014/001333
§ 371 (c)(1),
(2) Date: Aug. 13, 2015

(87) PCT Pub. No.: WO2014/141676
PCT Pub. Date: Sep. 18, 2014

(65) Prior Publication Data
US 2015/0378672 A1    Dec. 31, 2015

(30) Foreign Application Priority Data

Mar. 12, 2013 (JP) ................................ 2013-049735

(51) Int. Cl.
| | |
|---|---|
| *G10L 15/00* | (2013.01) |
| *G06F 3/16* | (2006.01) |
| *G01C 21/36* | (2006.01) |

(52) U.S. Cl.
CPC ............ *G06F 3/167* (2013.01); *G01C 21/3608* (2013.01); *G10L 15/00* (2013.01)

(58) Field of Classification Search
CPC ......... G10L 15/22; G10L 15/00; G10L 15/08; G10L 15/20; G10L 15/222; G10L 15/26

USPC ............. 704/275, 270, 270.1, 276, 231, 235, 704/251, 9, 10
See application file for complete search history.

(56) References Cited

U.S. PATENT DOCUMENTS

| | | | |
|---|---|---|---|
| 2003/0023632 A1* | 1/2003 | Ries ................... | G06F 17/3089 715/235 |
| 2004/0117804 A1* | 6/2004 | Scahill .................... | G06F 9/542 719/320 |

(Continued)

FOREIGN PATENT DOCUMENTS

| | | |
|---|---|---|
| JP | 2001-209571 | 8/2001 |
| JP | 2003-167895 | 6/2003 |

(Continued)

OTHER PUBLICATIONS

International Search Report issued Jun. 17, 2014 in International Application No. PCT/JP2014/001333.

*Primary Examiner* — Qi Han
(74) *Attorney, Agent, or Firm* — Wenderoth, Lind & Ponack, L.L.P.

(57) ABSTRACT

An information communication terminal includes the followings. An input receiving unit receives an input from a user. A communication unit obtains presentation information corresponding to an input by the user from a server according to a dialog scenario, every time the input is received. A dialog processing unit presents the user with the presentation information obtained by the communication unit. A communication state determination unit determines a communication state between the communication unit and the server. When the communication state determination unit makes a first determination that the communication is deteriorated during a dialog, the dialog processing unit causes the communication unit to obtain, as candidate presentation information, at least one presentation information with a possibility of being presented to the user after the first determination according to the dialog scenario.

10 Claims, 10 Drawing Sheets

(56) References Cited

U.S. PATENT DOCUMENTS

| | | |
|---|---|---|
| 2006/0080079 A1 | 4/2006 | Yamabana |
| 2006/0203980 A1* | 9/2006 | Starkie .................. G06F 8/30 379/88.18 |
| 2007/0005369 A1* | 1/2007 | Potter .................... G10L 15/01 704/275 |
| 2014/0164476 A1* | 6/2014 | Thomson ............. G06Q 10/101 709/203 |

FOREIGN PATENT DOCUMENTS

| | | |
|---|---|---|
| JP | 2005-250379 | 9/2005 |
| JP | 2006-99296 | 4/2006 |
| JP | 2009-124219 | 6/2009 |
| JP | 2009-153078 | 7/2009 |
| WO | 2012/011490 | 1/2012 |

\* cited by examiner

INFORMATION COMMUNICATION TERMINAL AND DIALOGUE PRESENTATION METHOD

TECHNICAL FIELD

The present invention relates to information communication terminals, and more particularly to an information communication terminal and the like that conduct dialogues with a user.

BACKGROUND ART

Conventionally, information communication terminals capable of conducting dialogues with users are known. Such an information communication terminal communicates with a server managed by a service provider so as to obtain, from the server, a reply to a user's speech, and then presents the obtained reply to the user (for example, see Patent Literature (PTL) 1).

CITATION LIST

Patent Literature

[PTL 1] Japanese Unexamined Patent Application Publication No. 2005-250379
[PTL 2] Japanese Unexamined Patent Application Publication No. 2006-99296

SUMMARY OF INVENTION

Technical Problem

If the communication between the information communication terminal as described above and the server is disconnected, the information communication terminal cannot reply to a user's speech until the communication is recovered. This disconnection in the communication between the information communication terminal and the server is problematic as the delay confuses the user.

In order to address the above problem, an object of the present invention is to provide an information communication terminal and the like which are capable of replying to a user's speech even while communication is disconnected.

Solution to Problem

According to an aspect of the present invention, there is a provided an information communication terminal that conducts a dialogue with a user according to a dialogue scenario indicating a presentation order for pieces of presentation information stored in a server, the information communication terminal including: an input receiving unit configured to receive an input by the user in the dialogue; a communication unit configured to obtain, from the server, a piece of the presentation information corresponding to the input by the user according to the dialogue scenario, every time the input receiving unit receives the input by the user; a dialogue processing unit configured to present the user with the piece of the presentation information obtained by the communication unit, as a response of the information communication terminal to the user in the dialogue; and a communication state determination unit configured to determine a communication state of communication between the communication unit and the server, wherein the dialogue processing unit is configured to, when the communication state determination unit makes a first determination that the communication state is deteriorated during the dialogue, cause the communication unit to obtain, as at least one piece of candidate presentation information, at least one piece of the presentation information subsequent in the presentation order according to the dialogue scenario to the piece of the presentation information presented to the user at a time the first determination is made.

This general and specific aspect may be implemented to a system, a method, an integrated circuit, a computer program, or a computer-readable recording medium such as a Compact Disc-Read Only Memory (CD-ROM), or may be any combination of them.

Advantageous Effects of Invention

The present invention makes it possible to continue a dialogue between an information communication terminal and a user even while communication between the information communication terminal and a server is disconnected. As a result, it is possible to reduce user's confusion.

DESCRIPTION OF EMBODIMENTS

Embodiment 1

Figure 1:
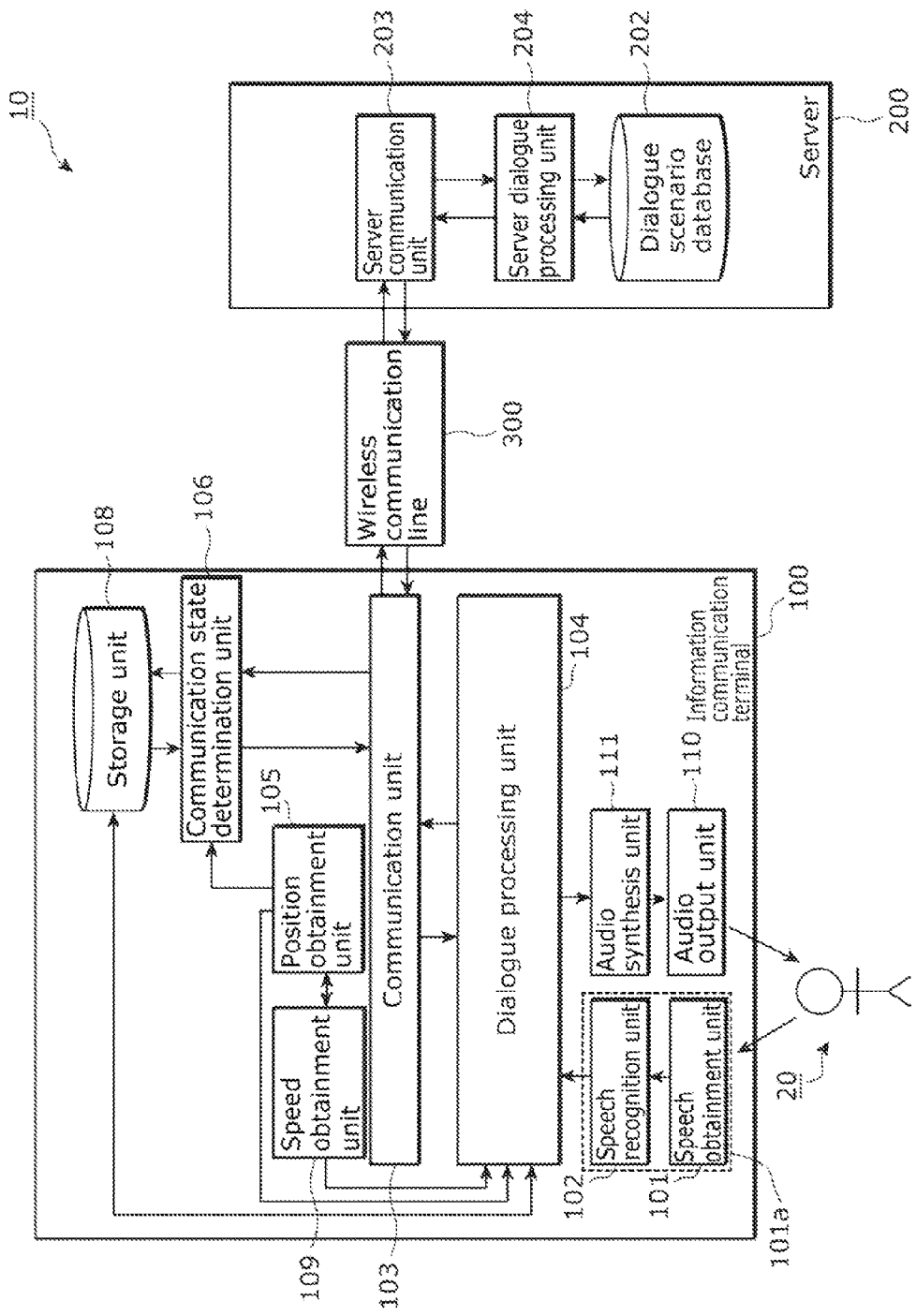
FIG. 1 is a block diagram illustrating a configuration of an audio dialogue system according to Embodiment 1.

Observation Based on which Present Invention is Conceived

As described in "Background Art", information communication terminals capable of conducting dialogues with users are known.

Such an information communication terminal has a problem that communication between the information communication terminal and the server is sometimes disconnected due to deterioration of the communication state, while the information communication terminal is conducting a dialogue with a user. In order to address this, PTL 1 discloses an audio dialogue system in which an information communication terminal is capable of resuming a dialogue with a user from a position where the dialogue is interrupted due to disconnection of communication between the information communication and a server, by notifying the server of the resuming position at the time the communication is recovered after the disconnection.

However, according to the technique disclosed in PTL 1, the information communication terminal cannot reply to a user's speech until communication between the information communication terminal and the server is recovered. Therefore, the disconnection in the communication between the information communication terminal and the server is problematic as the delay confuses the user.

Moreover, PTL 2 discloses a technique of determining, based on information indicating a communication state, whether translation processing is to be performed by an information communication terminal or by a server.

However, the technique disclosed in PTL 2 can perform the translation processing within the limits of the functions prepared in the information communication terminal. Therefore, when the technique such as PTL 2 is applied to the above-described dialogue processing, it is difficult to flexibly continue a dialogue according to a user's reply.

In order to solve the above-described problems, according to an aspect of the present invention, there is a provided an information communication terminal that conducts a dialogue with a user according to a dialogue scenario indicating a presentation order for pieces of presentation information stored in a server, the information communication terminal including: an input receiving unit configured to receive an input by the user in the dialogue; a communication unit configured to obtain, from the server, a piece of the presentation information corresponding to the input by the user according to the dialogue scenario, every time the input receiving unit receives the input by the user; a dialogue processing unit configured to present the user with the piece of the presentation information obtained by the communication unit, as a response of the information communication terminal to the user in the dialogue; and a communication state determination unit configured to determine a communication state of communication between the communication unit and the server, wherein the dialogue processing unit is configured to, when the communication state determination unit makes a first determination that the communication state is deteriorated during the dialogue, cause the communication unit to obtain, as at least one piece of candidate presentation information, at least one piece of the presentation information subsequent in the presentation order according to the dialogue scenario to the piece of the presentation information presented to the user at a time the first determination is made.

This obtainment of pieces of candidate presentation information when the communication state is deteriorated makes it possible to continue the dialogue by using the pieces of candidate presentation information even if the communication between the information communication terminal and the server becomes impossible afterwards. As a result, it is possible to reduce confusion the user feels during disconnection of the communication between the information communication terminal and the server.

It is also possible that when the input receiving unit receives a first input of the user after the communication unit obtains the at least one piece of candidate presentation information during the dialogue, (1) if the communication state determination unit determines that the communication state is a state where the communication is impossible, the dialogue processing unit is configured to present the user with the at least one piece of candidate presentation information which corresponds to the first input and has been obtained by the communication unit, and (2) if the communication state determination unit determines that the communication state is a state where the communication is possible, the communication unit is configured to obtain, from the server, a piece of the presentation information corresponding to the first input, and the dialogue processing unit is configured to present the user with the piece of the presentation information which corresponds to the first input and is obtained by the communication unit.

It is further possible that when the communication state determination unit makes the first determination during the dialogue, the dialogue processing unit is configured to select the at least one piece of candidate presentation information in a predetermined number sequentially following in the presentation order a piece of the presentation information presented at the time the first determination is made, and cause the communication unit to obtain the selected at least one piece of candidate presentation information.

As described above, the selection of pieces of candidate presentation information sequentially in order of being to be presented earlier can decrease a risk that the dialogue is interrupted.

It is still further possible that the server holds history information indicating a use frequency of each of the pieces of the presentation information stored in the server, and wherein when the communication state determination unit makes the first determination during the dialogue, the dialogue processing unit is configured to select the at least one piece of candidate presentation information in a predetermined number sequentially in order of having a higher use frequency based on the history information, and cause the communication unit to obtain the selected at least one piece of candidate presentation information.

This selection of pieces of candidate presentation information sequentially in order of having a higher use frequency can decrease a risk that the dialogue is interrupted.

It is still further possible that when the communication state determination unit makes the first determination during the dialogue, the dialogue processing unit is configured to select the at least one piece of candidate presentation information in a predetermined number sequentially in order of having a smaller data size, and cause the communication unit to obtain the selected at least one piece of candidate presentation information.

This selection of pieces of candidate presentation information sequentially in order of having a smaller data size can decrease a risk that the dialogue is interrupted.

It is still further possible that the information communication terminal further includes a position obtainment unit configured to obtain position information indicating a current position of the information communication terminal, the server holds regional history information that indicates a use frequency of each of the pieces of the presentation information stored in the server, for each region in which the piece of the presentation information has been used, and when the communication state determination unit makes first determination during the dialogue, the dialogue processing unit is configured to select, according to the regional history information, the at least one piece of candidate presentation information in a predetermined number sequentially in order of having a higher use frequency in an area including a position indicated in the position information, and cause the communication unit to obtain the selected at least one piece of candidate presentation information.

This structure makes it possible to obtain more dialogue units. As a result, it is possible to decrease the risk that the dialogue is interrupted.

It is still further possible that the information communication terminal is provided to a movable object, and the information communication terminal further includes a speed obtainment unit configured to obtain a moving speed of the movable object as a moving speed of the information communication terminal, and when the communication state determination unit makes the first determination during the dialogue, the dialogue processing unit is configured to cause the communication unit to obtain more pieces of the candidate presentation information as the moving speed is slower.

In general, it is considered that the communication state is recovered soon if the moving speed is high. Therefore, when the moving speed is high, the number of pieces of candidate presentation information required to continue the dialogue is small. This structure makes it possible to efficiently obtain pieces of candidate presentation information and decrease a risk that the audio dialogue is interrupted.

It is still further possible that the information communication terminal further includes a storage unit configured to hold the at least one piece of candidate presentation information which has been obtained by the communication unit, and when the communication state determination unit makes the first determination during the dialogue, the dialogue processing unit is configured to cause the communication unit to obtain more pieces of candidate presentation information as the storage unit has a larger spare capacity.

This structure makes it possible to efficiently obtain pieces of candidate presentation information according to a spare capacity of the storage unit, and decrease a risk that the audio dialogue is interrupted.

It is still further possible that the communication state determination unit is configured to make the first determination, when a Bit Error Rate (BER) of a signal in the communication between the communication unit and the server is greater than a first threshold value.

It is still further possible that the communication state determination unit is configured to make the first determination, when the BER changes by a smaller temporal change amount than a predetermined temporal change amount, to be greater than the first threshold value.

It is still further possible that the information communication terminal further includes: a position obtainment unit configured to obtain position information indicating a current position of the information communication terminal; and a storage unit configured to hold communication state information in which a position of the information communication terminal and the communication state determined at the position are associated with each other, wherein the communication state determination unit is configured to make the first determination, based on the position information and the communication state information.

It is still further possible that the communication state information is a history of the communication state, in which the position indicated in the position information that has been obtained by the position obtainment unit and a determination result of the communication state that has been determined at the position by the communication state determination unit are associated with each other.

It is still further possible that the information communication terminal further includes an audio output unit configured to output sound, wherein the dialogue processing unit is configured to cause the audio output unit to output sound to present the user with the piece of the presentation information which is obtained by the communication unit.

It is still further possible that the information communication terminal further includes a display unit configured to display image, wherein the dialogue processing unit is configured to cause the display unit to display image to present the user with the piece of the presentation information which is obtained by the communication unit.

It is still further possible that the input receiving unit includes: a speech obtainment unit configured to obtain a speech of the user as the input by the user; and a speech recognition unit configured to recognize the speech of the user which is obtained by the speech obtainment unit, wherein the communication unit is configured to obtain, from the server, the piece of the presentation information which corresponds to a result of the recognition of the speech of the user according to the dialogue scenario, every time the speech recognition unit recognizes the speech of the user.

According to another aspect of the present invention, there is provided a dialogue presentation method used by a server to transmit a piece of presentation information corresponding to an information obtainment request to an information communication terminal according to a dialogue scenario indicating a presentation order for pieces of presentation information including the piece of the presentation information, every time the server receives the information obtainment request from the information communication terminal operated by a user, the dialogue presentation method including, when the server receives the information obtainment request including communication deterioration information indicating that a communication state between the server and the information communication terminal is deteriorated, transmitting, as at least one piece of candidate presentation information, at least one piece of the presentation information subsequent in the presentation order according to the dialogue scenario to the piece of the presentation information already transmitted to the information communication terminal.

This general and specific aspect may be implemented to a system, a method, an integrated circuit, a computer program, or a computer-readable recording medium such as a CD-ROM, or may be any combination of them.

Hereinafter, certain exemplary embodiments are described in greater detail with reference to the accompanying Drawings.

It should be noted that all the embodiments described below are generic and specific examples of the present invention. Numerical values, shapes, materials, constituent elements, arrangement positions and the connection configuration of the constituent elements, steps, the order of the steps, and the like described in the following embodiments are merely examples, and are not intended to limit the present invention. Therefore, among the constituent elements in the following embodiments, constituent elements that are not described in independent claims that show the most generic concept of the present invention are described as elements constituting more desirable configurations.

Embodiment 1

The following describes an audio dialogue system according to Embodiment 1.

FIG. 1 is a block diagram illustrating a configuration of the audio dialogue system according to Embodiment 1.

The audio dialogue system 10 includes an information communication terminal 100, a server 200, and a wireless communication line 300 connecting the information communication terminal 100 and the server 200 to each other. According to Embodiment 1, the information communication terminal 100 is a vehicle navigation device provided to a movable object (vehicle), and conducts audio dialogues with a user 20 by recognizing speeches of the user 20 and replying to the speeches. It should be noted that the information communication terminal 100 may be an in-vehicle device fixed to a vehicle, or a communication terminal that can be taken out from a vehicle.

Here, an audio dialogue is briefly described. An audio dialogue is conducted according to a prepared dialogue scenario. As one example, the following describes a dialogue scenario for restaurant search.

In a dialogue scenario for restaurant search, the user 20 first utters voice (speech) to ask the information communication terminal 100 to search for a restaurant. In response to the speech, the information communication terminal 100 first obtains and recognizes the speech of the user 20. Based on the result of the speech recognition, the information communication terminal 100 obtains, from the server 200, presentation information (a question to the user 20) that is prepared in a dialogue scenario database 202 in the server 200, and outputs sound "What kind of cuisine?" that corresponds to the obtained presentation information. According to Embodiment 1, it is assumed that a single audio dialogue is conducted based on a single dialogue scenario, and that a single audio dialogue consists of a plurality of dialogue units. The dialogue units are constituent units in a dialogue, and each of the dialogue units includes at least a piece of presentation information.

Subsequently, in response to such a question from the information communication terminal 100, the user 20 is assumed to reply "Italian" by voice. In response to the reply, in the same manner as above, the information communication terminal 100 obtains a dialogue unit corresponding to the reply from the user 20, and outputs sound corresponding to the obtained dialogue unit.

Subsequently, the information communication terminal 100 asks the user 20 questions about an area, a meal budget, and the like for searching for a restaurant according to the dialogue scenario, and the user 20 sequentially replies to these questions. Finally, a restaurant selected based on the replies from the user 20 is presented to the user 20 as a search result, and the audio dialogue is ended.

Referring again to FIG. 1, a detailed configuration of the audio dialogue system 10 is described.

First, the information communication terminal 100 is described.

The information communication terminal 100 included in the audio dialogue system 10 includes an input receiving unit 101a (a speech obtainment unit 101 and an speech recognition unit 102), a communication unit 103, a dialogue processing unit 104, and a communication state determination unit 106. Furthermore, the information communication terminal 100 includes a position obtainment unit 105, a storage unit 108, a speed obtainment unit 109, an audio output unit 110, and an audio synthesis unit 111.

The speech obtainment unit 101 obtains a speech of the user 20 in an audio dialogue, and generates a digital audio signal from the speech. In more detail, the speech obtainment unit 101 includes, for example, a microphone and an analog-digital (A/D) converter.

The speech recognition unit 102 recognizes the digital audio signal generated by the speech obtainment unit 101. The speech recognition unit 102 recognizes a speech of the user 20 by an existing speech recognition technique, and thereby generates audio data in a text format. The generated audio data is transmitted to the communication unit 103 via the dialogue processing unit 104.

The communication unit 103 transmits the audio data generated by the speech recognition unit 102 to the server 200 via the wireless communication line 300, and obtains, from the server 200, presentation information corresponding to the audio data according to the dialogue scenario. In other words, the communication unit 103 obtains, from the server 200, presentation information according to the recognition result, every time the speech recognition unit 102 recognizes a speech. The communication unit 103 is, for example, a wireless module capable of wireless communication using a line, such as third generation (3G) line, fourth generation (4G) line, Wireless Fidelity (Wi-Fi) (registered trademark), or Zigbee (registered trademark).

The dialogue processing unit 104 controls the information communication terminal 100 in audio dialogues. The dialogue processing unit 104 outputs audio data corresponding to an audio unit obtained by the communication unit 103 to the audio synthesis unit 111. The audio data outputted by the dialogue processing unit 104 is converted by the audio synthesis unit 111 to a digital audio signal and outputted from the audio output unit 110. In other words, the dialogue processing unit 104 presents presentation information (dialogue unit) obtained by the communication unit 103 to the user 20, as a reply of the information communication terminal 100 to the user 20 in a dialogue.

Furthermore, if the communication state determination unit 106 determines, during a dialogue, that a state of communication between the information communication terminal 100 and the server 200 (hereinafter, referred to also simply as a "communication state") is deteriorated, the dialogue processing unit 104 caches pieces of presentation information as pieces of candidate presentation information, and continues the audio dialogue by using the cached pieces of candidate presentation information, if necessary. The details of the audio dialogue (audio dialogue processing) are described later.

It should be noted that the dialogue processing unit 104 may be implemented to hardware only, or to a combination of hardware and software. It should also be noted that the dialogue processing unit 104 may be implemented to a processor, a micro computer, or the like.

The position obtainment unit 105 obtains position information indicating a current position of the information communication terminal 100. More specifically, the position obtainment unit 105 is a Global Positioning System (GPS) module. However, the position obtainment unit 105 may be anything capable of obtaining the position information of the information communication terminal 100.

The communication state determination unit 106 examines a communication state of communication between the communication unit 103 and the server 200. More specifically, the communication state determination unit 106 monitors a Bit Error Rate (BER) of a signal received by the communication unit 103 in the communication. If BER is greater than a first threshold value, the communication state determination unit 106 determines that the communication state is deteriorated. If BER is greater than a second threshold value that is greater than the first threshold value, the communication state determination unit 106 determines that the communication state is the state where the communication is impossible. If BER is smaller than or equal to the predetermined first threshold value, the communication state determination unit 106 determines that the communication state is the state where the communication is possible.

It should be noted that the communication state determination unit 106 may make the determination on the communication state based on a radio field intensity of the communication unit 103 (wireless module), or based on a communication speed of the communication unit 103. Moreover, the communication state determination unit 106 may make the determination on the communication state based on communication state information described later.

The storage unit 108 holds pieces of candidate presentation Information and communication state information.

The pieces of candidate presentation information are pieces of presentation information which have been obtained beforehand for future uses when the communication state has been deteriorated. Therefore, when the information communication terminal 100 cannot communicate with the server 200, the dialogue processing unit 104 can present the user 20 with appropriate one of the pieces of candidate presentation information instead of a target piece of presentation information. For example, if the communication state determination unit 106 makes a first determination that the communication state is deteriorated during a first audio dialogue conducted according to a first dialogue scenario, pieces of presentation information, which have a possibility of being presented to the user 20 after the first determination, are selected as pieces of candidate presentation information based on the first dialogue scenario. In other words, the pieces of candidate presentation information are pieces of presentation information subsequent in a presentation order for pieces of presentation information according to the dialogue scenario to a piece of presentation information presented to the user at the time the first determination has been made.

Here, if a first audio dialogue is being conducted according to the first dialogue scenario at the time the first determination is made, pieces of presentation information having a possibility of being presented to the user 20 after the first determination means pieces of presentation information having a possibility of being presented to the user 20 before the end of the first audio dialogue and after the first determination in the first audio dialogue. In other words, pieces of presentation information having a possibility of being presented to the user 20 after the first determination does not include any piece of presentation information that is to be presented after the first determination and that is to be used in an audio dialogue conducted according to a dialogue scenario different from the first dialogue scenario.

It should be noted that the expression "during the first audio dialogue" refers to both during presentation of presentation information by the dialogue processing unit 104 and during response from the user 20. In other words, according to Embodiment 1, the expression "during the first audio dialogue" refers to during execution of a dialogue scenario.

The communication state information is information in which a position of the information communication terminal 100 and a communication state determined at the position are associated with each other. According to Embodiment 1, the communication state information can be generated, for example, if the information communication terminal 100 memorizes, in real time, a communication state of the communication unit 103 and position information obtained by the position obtainment unit 105 while the movable object provided with the information communication terminal 100 is moving. In other words, in the above case, the communication state information is a history of a past communication state, in which a position indicated in the position information obtained by the position obtainment unit 105 is associated with a determination result of the communication state determined at the position by the communication state determination unit 106.

The use of such communication state information enable a wait time calculation unit 107 to estimate a time when the communication state is deteriorated, by comparing current position information obtained by the position obtainment unit 105 to the communication state information.

The communication state information may be, for example, map information of a communication state which is provided from a service provider providing wireless communication services to associate the communication state with position information. Furthermore, the communication state information may be information of a building or the like on map information in a vehicle navigation system. In this case, for example, a position with poor radio wave condition, such as the inside of a tunnel or a vicinity of a high-rise building is treated as a position where a communication state between the communication unit 103 and the server 200 is deteriorated.

Specifically, the storage unit 108 is, for example, a semiconductor memory, a Hard Disc Drive (HDD), or the like. Although it has been described in Embodiment 1 that the storage unit 108 is included in the information communication terminal 100, the storage unit 108 may be separated from the information communication terminal 100. For example, the storage unit 108 may be implemented to a Universal Serial Bus (USB) memory or an external Hard Disk Drive (HDD). In other words, the storage unit 108 is not an essential structural element.

Furthermore, although it has been described in Embodiment 1 that both the pieces of candidate presentation information and the communication state information are stored in the same single storage unit 108, the candidate presentation information and the communication state information may be stored in different storage units.

The speed obtainment unit 109 obtains a moving speed (a speed and a moving direction) of the information communication terminal 100 ($\approx$ user 20, a movable object). According to Embodiment 1, a speed of a movable object is obtained from the movable object via a Controller Area Network (CAN). The speed may be calculated using a change (displacement) of position information generated by the position obtainment unit 105. In other words, the speed obtainment unit 109 is not an essential structural element. The method of obtaining a speed by the speed obtainment unit 109 of the information communication terminal 100 is not limited to the method of obtaining a speed of a movable object, and may be any methods.

The audio synthesis unit 111 converts audio data to a digital audio signal and provides the digital audio signal to the audio output unit 110.

The audio output unit 110 outputs the digital audio signal as sound. In the present embodiment, the information communication terminal 100 is implemented to a vehicle navigation device. Therefore, the sound reproduced by the information communication terminal 100 (music, radio broadcast, navigation sound, or the like) and the digital audio signal outputted by the audio synthesis unit 111 as information to be presented to the user 20 are synthesized and outputted as sound.

Next, the wireless communication line 300 is described.

The wireless communication line 300 included in the audio dialogue system 10 is, for example, a line, such as 3G, 4G, Wi-Fi (registered trademark), or Zigbee (registered trademark). The wireless communication line 300 is typically a line provided from a service provider (communication service provider) providing wireless communication services. Although in FIG. 1 the information communication terminal 100 and the wireless communication line 300 are directly connected to each other, it is also possible that the information communication terminal 100 is connected to the wireless communication line 300 via a relay device, such as a smartphone or a wireless router.

Next, the server 200 is described.

The server 200 in the audio dialogue system 10 includes a server communication unit 203, a server dialogue processing unit 204, and a dialogue scenario database 202.

The server communication unit 203 receives audio data transmitted by the communication unit 103, and transmits a dialogue unit corresponding to the received audio data to the communication unit 103. The server communication unit 203 is, for example, a wireless module.

The server dialogue processing unit 204 selects, from the dialogue scenario database 202, a dialogue unit corresponding to audio data received by the server communication unit 203, and transmits the selected dialogue unit to the communication unit 103 via the server communication unit 203. The server dialogue processing unit 204 may be implemented to a processor, a micro computer, or the like.

The dialogue scenario database 202 is a storage unit holding a dialogue scenario consisting of a plurality of dialogue units. Specifically, the dialogue scenario database 202 is a semiconductor memory, a Hard Disc Drive (HDD), or the like.

Figure 2:
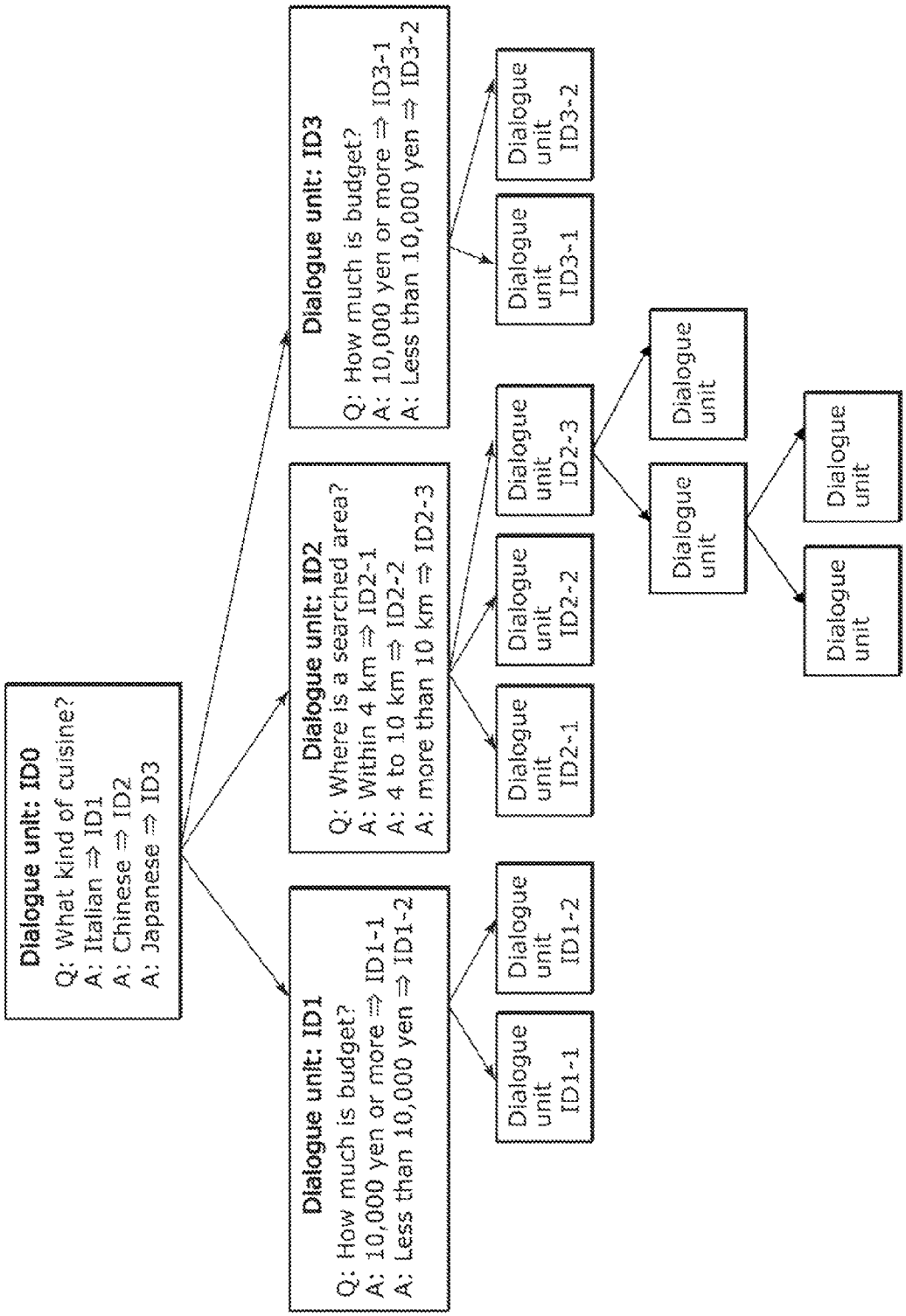
FIG. 2 is a diagram for explaining a dialogue scenario.

FIG. 2 is a diagram for explaining a dialogue scenario.

Figure 3:
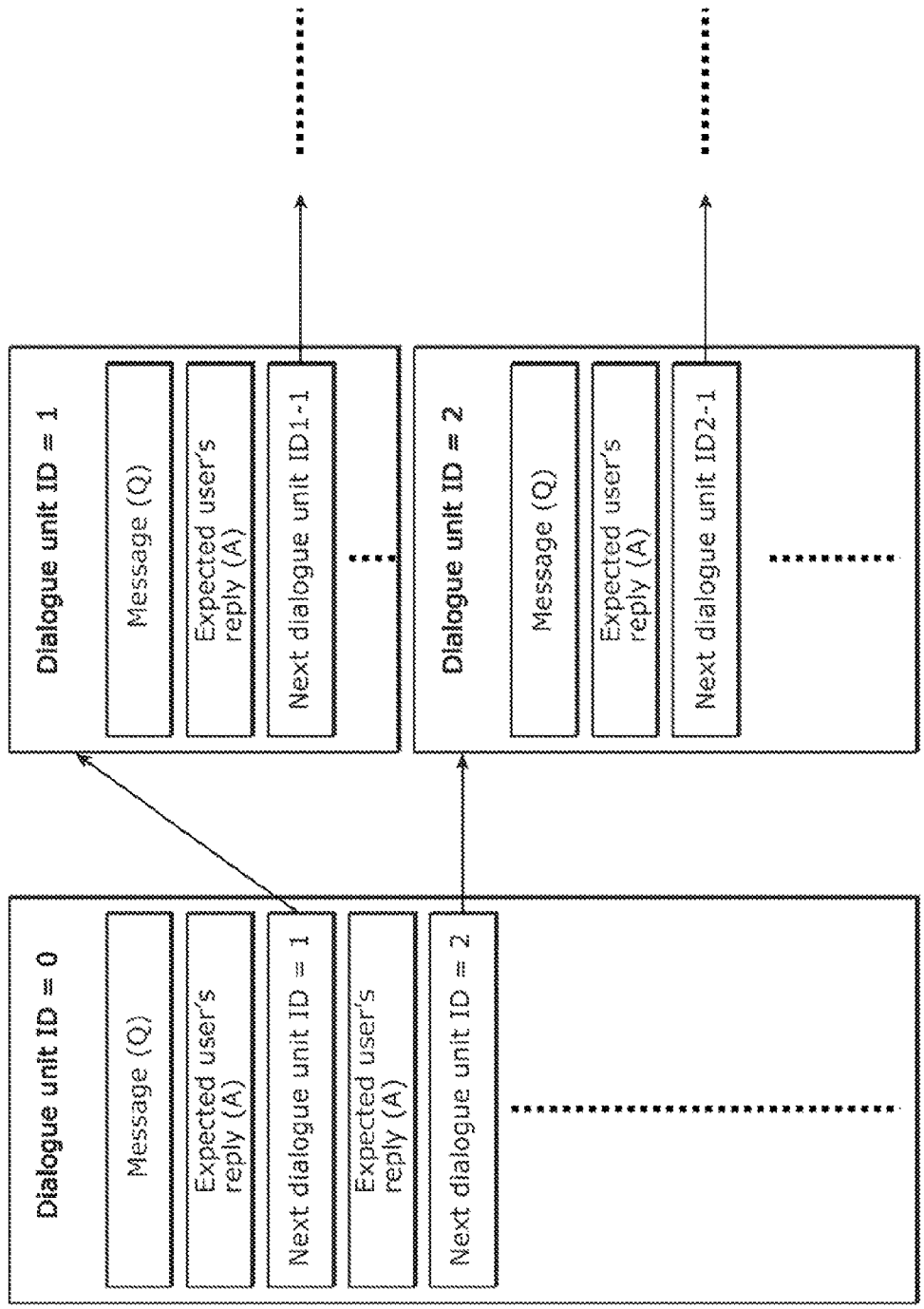
FIG. 3 is a diagram illustrating a data structure of the dialogue scenario.

FIG. 3 is a diagram illustrating a data structure of the dialogue scenario.

Referring to FIG. 2, the dialogue scenario according to Embodiment 1 has a tree data structure of question steps (order of steps) given by the information communication terminal 100. In this description, one of units included in a dialogue is referred to as a dialogue unit.

According to Embodiment 1, as illustrated in FIG. 3, a dialogue scenario is information having a data structure including pieces of data in each of which (a) a dialogue unit IDentifiation (ID), (b) presentation information (message) to be presented by the information communication terminal 100 to the user 20, (c) an expected reply from the user 20 in response to the message, and (d) branch information (next dialogue unit ID) in response to the expected reply are associated with one another.

It should be noted that the dialogue scenario may have any data structure as long as the dialogue scenario indicates an order of presenting pieces of presentation information. For example, the dialogue scenario may be information that does not include pieces of presentation information and indicates only an order of presenting the pieces of presentation information, and that is stored in the storage unit 108 of the information communication terminal 100.

Next, the audio dialogue processing performed by the audio dialogue system 10 having the above-described configuration according to Embodiment 1 is described. In the audio dialogue processing when the communication state is good, a speech of the user 20 is recognized, and therefore a piece of presentation information corresponding to the result of the speech recognition is obtained. On the other hand, when the communication state is deteriorated, the communication state determination unit 106 determines the communication state as deteriorated, and therefore pieces of candidate presentation information are obtained, which is different from the case of the good communication state. In other words, the audio dialogue processing of the audio dialogue system 10 is characterized by obtaining (caching) pieces of candidate presentation information regardless of a state of an audio dialogue when a communication state is deteriorated during an audio dialogue.

The caching of pieces of candidate presentation information is performed only when a communication state is deteriorated during an audio dialogue. It is therefore possible to reduce an area holding pieces of candidate presentation information in the storage unit 108. As described in Embodiment 1, a vehicle navigation device or the like has a limited capacity of the storage unit 108 to some extent. Therefore, it is advantageous to cache pieces of candidate presentation information only when a communication state is deteriorated during an audio dialogue.

Figure 4:
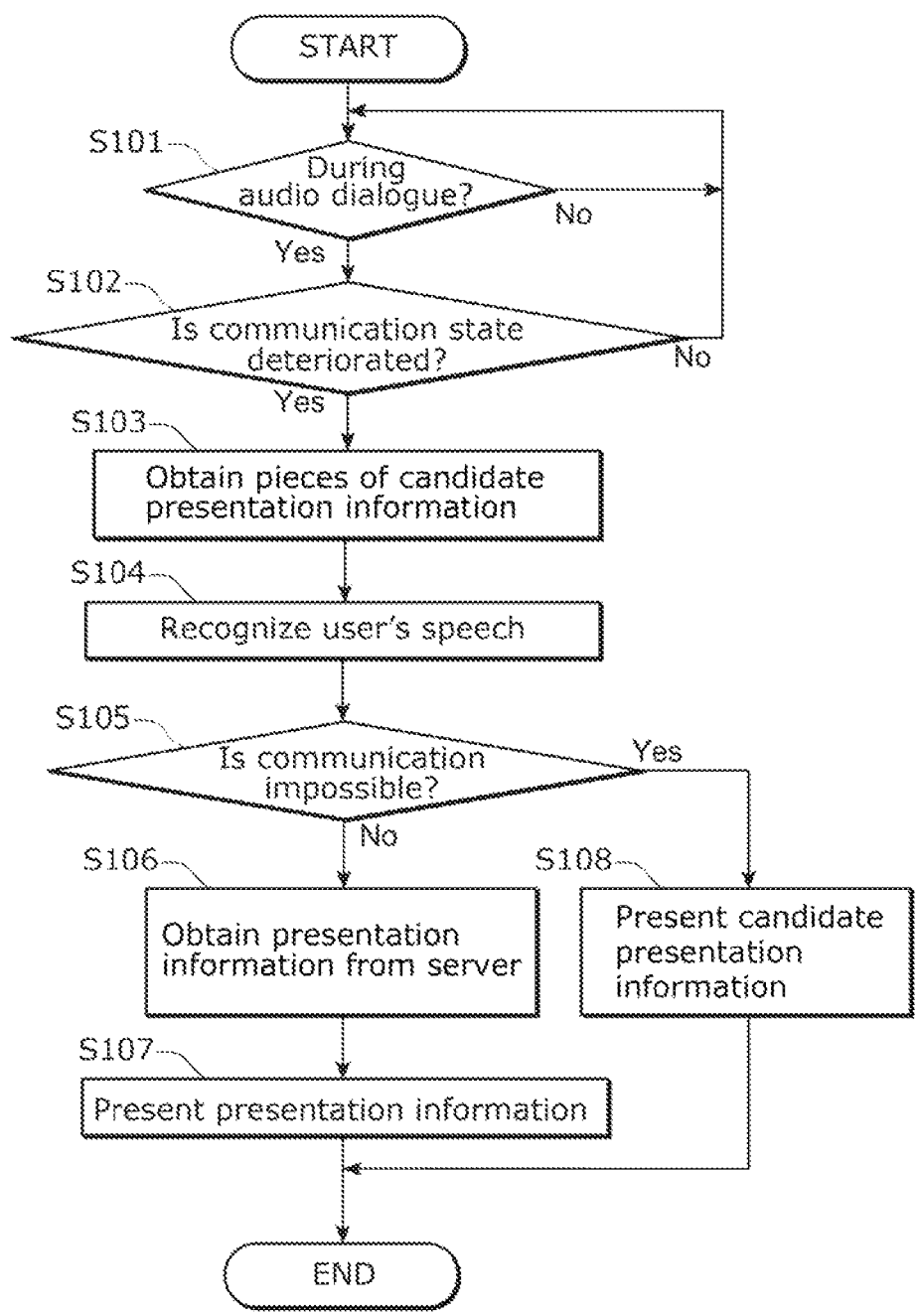
FIG. 4 is a flowchart of audio dialogue processing performed by the audio dialogue system according to Embodiment 1.

FIG. 4 is a flowchart of the audio dialogue processing performed by the dialogue system 10.

First, the dialogue processing unit 104 determines whether or not an audio dialogue is currently conducted (S101). If an audio dialogue is currently conducted (Yes at S101), then the communication state determination unit 106 examines whether or not a communication state between the communication unit 103 and the server 200 is deteriorated (S102). If the communication state between the communication unit 103 and the server 200 is not deteriorated (No at S102), or if no audio dialogue is currently conducted (No at S101), then the processing returns to the determination (S101) as to whether or not an audio dialogue is currently conducted.

If the communication state determination unit 106 determines that the communication state between the communication unit 103 and the server 200 is deteriorated (Yes at S102), then the dialogue processing unit 104 causes the communication unit 103 to obtain at least one of the pieces of candidate presentation information. According to Embodiment 1, the dialogue processing unit 104 selects, as pieces of candidate presentation information, a predetermined number of pieces of presentation information sequentially in order of being to be presented earlier (hereinafter, referred to as "In order of earlier presentation" or simply as "in a presentation order"), and causes the communication unit 103 to obtain the selected pieces of candidate presentation information. The communication unit 103 obtains the pieces of candidate presentation information selected by the dialogue processing unit 104 (S103). It should be noted that the obtained pieces of candidate presentation information are stored in the storage unit 108.

If the communication unit 103 obtains the pieces of candidate presentation information and then the speech recognition unit 102 completes recognition of a speech of the user 20 which is a reply from the user 20 in the dialogue (S104), then the communication state determination unit 106 examines the communication state again (S105). If the communication between the communication unit 103 and the server 200 is possible (No at S105), then the communication unit 103 (dialogue processing unit 104) obtains, from the server 200, a piece of presentation information that corresponds to the recognition result of the speech of the user 20 according to the dialogue scenario (S106), and the dialogue processing unit 104 presents the obtained presentation information to the user 20 (S107).

On the other hand, if it is determined at S105 that the communication is impossible (Yes at S105), then the dialogue processing unit 104 selects an appropriate piece of candidate presentation information corresponding to the recognition result of the speech of the user 20 from the pieces of candidate presentation information obtained at Step S103, and presents the selected piece of candidate presentation information to the user 20 (S108).

Next, the above audio dialogue processing is described in more detail. Hereinafter, "obtain a piece of presentation information" is also expressed as "obtain a dialogue unit".

Figure 5:
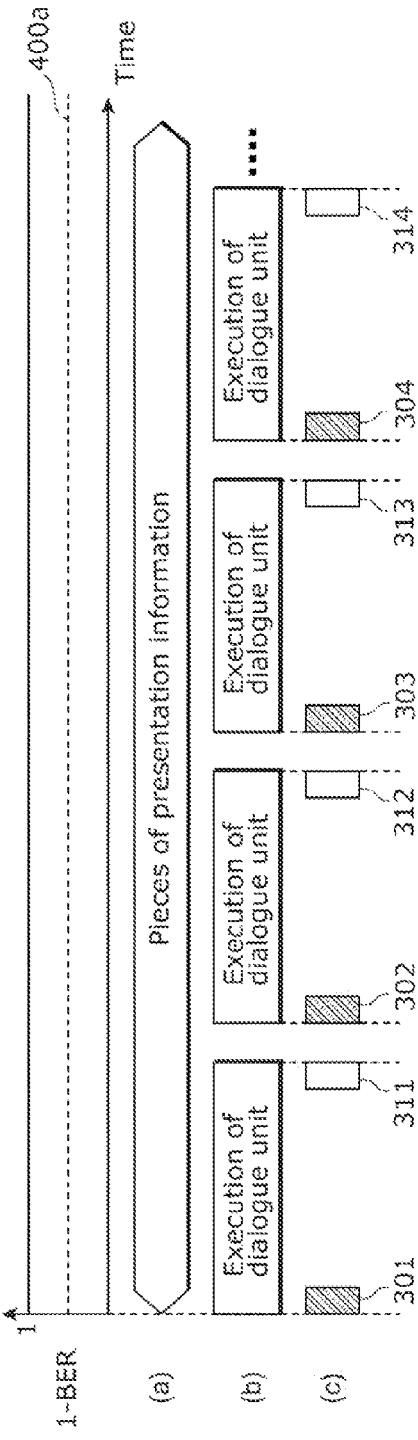
FIG. 5 is a schematic diagram for explaining audio dialogue processing performed when a communication state is good.

FIG. 5 is a schematic diagram for explaining audio dialogue processing performed when a communication state is good.

Referring to FIG. 5, the communication state determined by the communication state determination unit 106 is expressed by (1-BER). More specifically, in the graph indicating (1-BER) in FIG. 5, a higher value along the vertical axis represents a smaller BER and a better communication state, while a lower value along the vertical axis represents a greater BER and a worse communication state.

In FIG. 5, (a) illustrates a kind of information presented in the audio dialogue, and (b) illustrates an execution period of each dialogue unit. Furthermore, (c) in FIG. 5 illustrates periods in each of which the communication unit 103 is performing communication.

In FIG. 5, the communication state is kept good in the duration shown in the graph. Therefore, as illustrated in (a) in FIG. 5, no dialogue unit is cached in the duration shown in the graph. The dialogue processing unit 104 causes the communication unit 103 to obtain a dialogue unit (a piece of presentation information) from the server 200 every time the user 20 makes a reply, and thereby presents the piece of presentation information included in the obtained dialogue unit. In other words, the audio dialogue processing is led by the server 200.

More specifically, as illustrated in (b) and (c) in FIG. 5, the communication unit 103 obtains a dialogue unit from the server 200 in each of periods 301, 302, 303, and 304 for starting execution of a corresponding dialogue unit. Furthermore, in each of periods of 311, 312, 313, and 314 for ending execution of a corresponding dialogue, a reply (audio data) of the user 20 is transmitted to the server 200.

Figure 6:
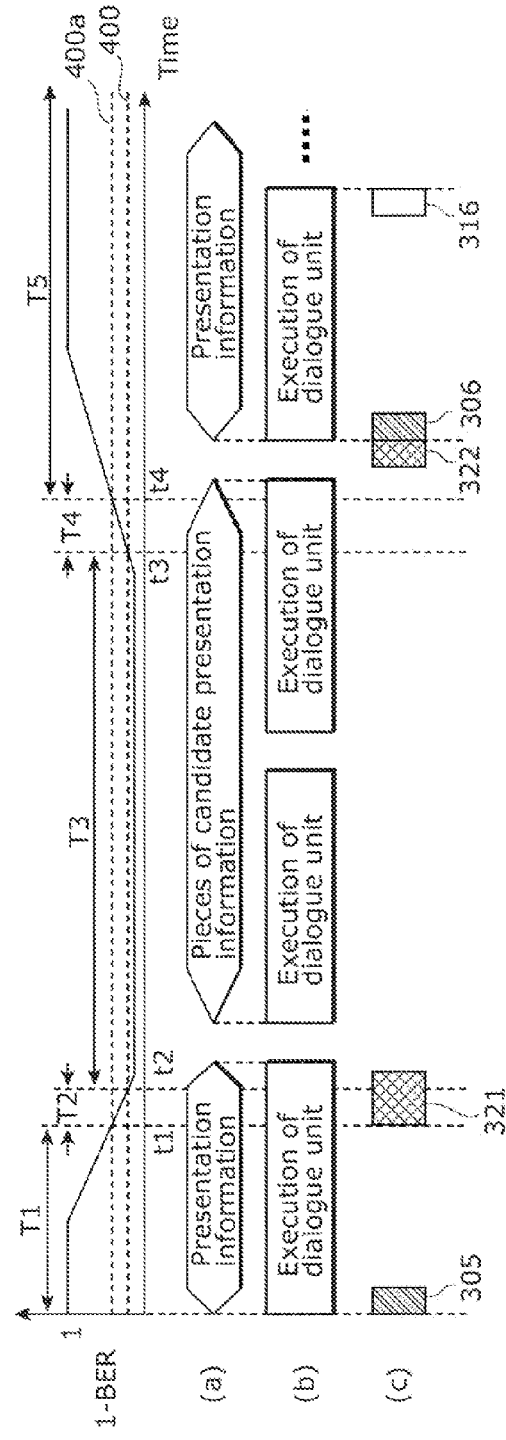
FIG. 6 is a diagram for explaining audio dialogue processing performed when a communication state is deteriorated during a dialogue.

In contrast, FIG. 6 is a diagram for explaining audio dialogue processing performed when a communication state is deteriorated during a dialogue. In FIG. 6, (1-BER), (a), (b), and (c) represent the same pieces of data as FIG. 5. In the graph in FIG. 6 plotting the communication state, a first threshold value 400*a* and a second threshold value 400 are given.

In FIG. 6, in each of periods T1 and T5, (1-BER) is greater than the first threshold value 400*a*, in other words, BER is smaller or equal to the first threshold value 400*a*. Therefore, in each of periods T1 and T5, the communication state determination unit 106 determines that the communication state is good (the communication is possible).

In each of periods T2 and T4, (1-BER) is smaller than or equal to the first threshold value 400*a* and greater than the second threshold value 400. In other words, in each of periods T2 and T4, BER is greater than the first threshold value 400*a* and smaller than or equal to the second threshold value 400. Therefore, in each of periods T2 and T4, the communication state determination unit 106 determines that the communication is deteriorated but still possible.

In period T3, (1-BER) is smaller than or equal to the second threshold value 400, in other words, BER is greater than the second threshold value 400. Therefore, in period T3, the communication state determination unit 106 determines that the communication is impossible.

In period T1 immediately after starting the audio dialogue, the communication state is good as described above. Therefore, as illustrated in (a) in FIG. 6, the dialogue processing unit 104 causes the communication unit 103 to obtain a dialogue unit from the server 200 and presents the obtained dialogue unit. More specifically, as illustrated in (b) and (c) in FIG. 6, the communication unit 103 obtains the dialogue unit from the server 200 in period 305 for starting execution of the dialogue unit.

However, at time t1 (a time of starting period T2) during the execution of the dialogue unit, BER becomes greater than the first threshold value 400*a*. Therefore, in period 321 immediately after time t1, the dialogue processing unit 104 causes the communication unit 103 to obtain dialogue units (pieces of candidate presentation information).

In period T2, the communication is deteriorated but still possible. Therefore, in such a period, the dialogue processing unit 104 causes the communication unit 103 to obtain a dialogue unit from the server 200 and presents the obtained dialogue unit. If a reply from the server 200 has not been received for a certain time period and no dialogue unit can be obtained, the dialogue processing unit 104 reproduces a message "Please wait a moment."

Here, it is also possible that, in a period, such as period T2, in which the communication is deteriorated but still possible, the dialogue processing unit 104 presents a dialogue unit cached as candidate presentation information.

At time t2 after time t1, BER becomes greater than the second threshold value 400, and the communication becomes impossible in period T3 following time t2. Therefore, dialogue units that are executed (starts) in period T3 is dialogue units that have been cached as pieces of candidate presentation information in period 321 as illustrated in (a) and (b) in FIG. 6. In other words, in period T3, the audio dialogue processing is led by the information communication terminal 100.

It should be noted that, if no dialogue unit (candidate presentation information) corresponding to a reply of the user 20 is cached, the dialogue processing unit 104 reproduces a message, such as "Please wait a moment", which informs that the audio dialogue cannot be continued. Such message reproduction is performed, for example, when the period in which the communication is impossible is long.

At time t3 (end time of period T3), BER becomes smaller than or equal to the second threshold value 400. Furthermore, at following time t4, BER becomes smaller than or equal to the first threshold value 400*a*. Therefore, as illustrated in (c) in FIG. 6, in period 322 after the end of the execution of the dialogue unit which has been executed at time t4 at which BER becomes smaller than or equal to the first threshold value 400*a*, the dialogue processing unit 104 (communication unit 103) transmits, to the server 200, an ID of a dialogue unit to be executed next. In other words, in period 322, the leader of the audio dialogue processing changes from the information communication terminal 100 to the server 200.

In the following period 306, the communication unit 103 obtains a dialogue unit from the server 200, and the dialogue processing unit 104 presents the user 20 with a piece of presentation information included in the obtained dialogue unit. Then, in period 316 for ending the execution of the dialogue unit, a reply of the user 20 is transmitted to the server 200.

As explained above, the information communication terminal 100 caches dialogue units to continue a current audio dialogue by using piece(s) of candidate presentation information included in the cached dialogue units, even in the state where the communication with the server 200 is impossible.

Next, the candidate presentation information is described in more detail.

Figure 7:
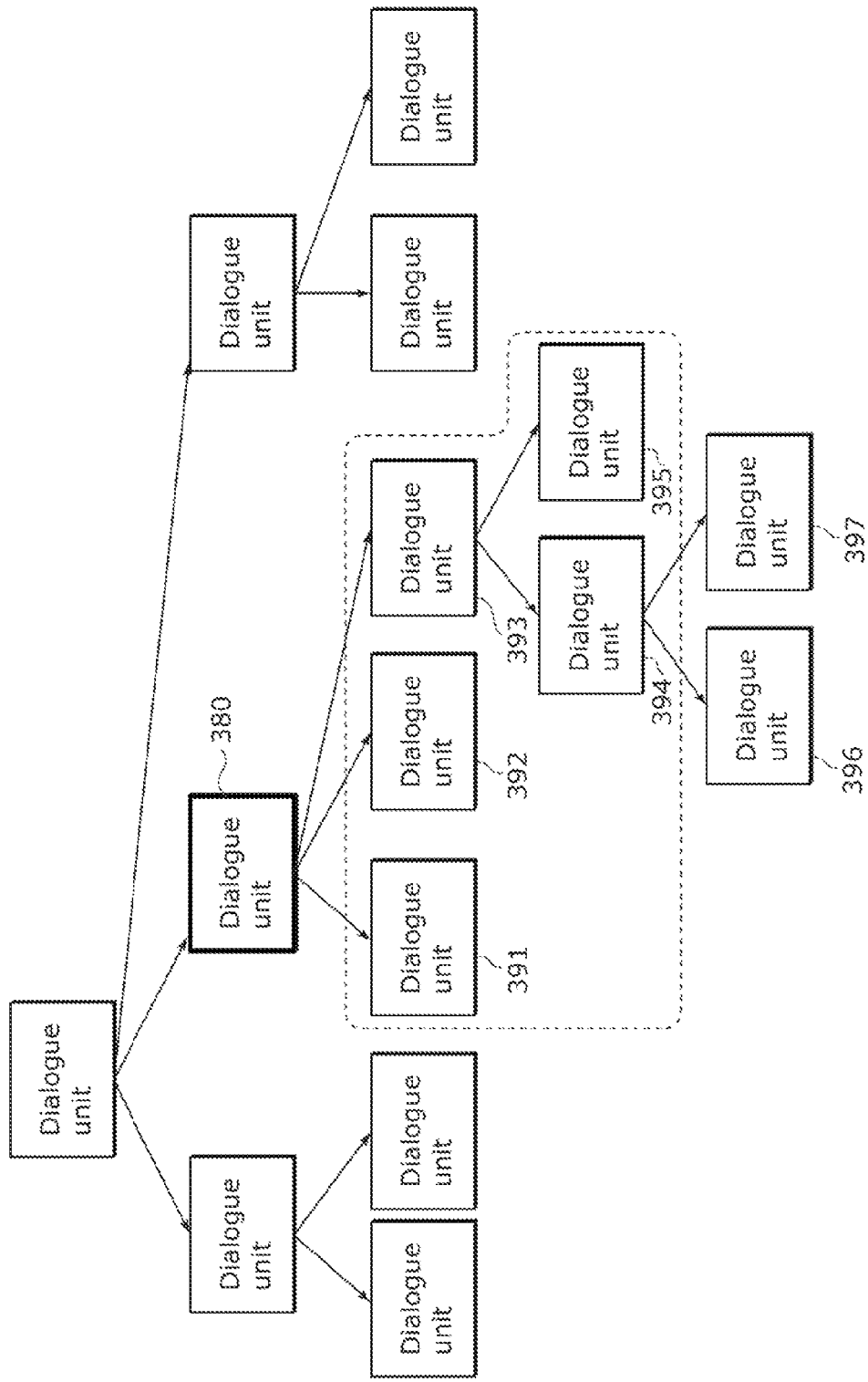
FIG. 7 is a diagram for explaining pieces of candidate presentation information.

FIG. 7 is a diagram for explaining pieces of candidate presentation information.

A dialogue unit 380 illustrated in FIG. 7 is a dialogue unit that is being executed at the time the communication state determination unit 106 determines that the communication state is deteriorated. In this case, dialogue units having a possibility of being executed in response to a reply of the user 20 after the determination, in other words, dialogue units each including candidate presentation information, are dialogue units 391 to 397 in the example of FIG. 7.

According to Embodiment 1, the dialogue processing unit 104 selects, from among the dialogue units 391 to 397, a predetermined number of dialogue units (pieces of candidate presentation information) sequentially following the dialogue unit 380 in the presentation order, and then causes the communication unit 103 to obtain the selected dialogue units.

Here, in the example of FIG. 7, dialogue units that are the earliest after the dialogue unit 380 in the presentation order are dialogue units 391 to 393, and dialogue units that are the second earliest after the dialogue unit 380 in the presentation order are dialogue units 394 and 395. Dialogue units that are the third earliest after the dialogue unit 380 in the presentation order are dialogue units 396 and 397.

Therefore, if the predetermined number of dialogue units to be selected by the dialogue processing unit 104 is five, the dialogue units 391 to 395 surrounded by a broken line in FIG. 7 are selected.

It should be noted that the method of selecting dialogue units is not limited to the above method.

For example, it is also possible that the dialogue processing unit 104 selects a predetermined number of dialogue units (pieces of candidate presentation information) sequentially in order of having a smaller data size, and causes the communication unit 103 to obtain the selected dialogue units.

As described above, since a vehicle navigation device or the like has limited storage resources, the number of cacheable dialogue units is limited. In such a case, by selecting dialogue units sequentially in order of having a smaller data size, the dialogue processing unit 104 can store more dialogue units into the storage unit 108. It is thereby possible to increase the number of cacheable dialogue units. As a result, there are advantages that an audio dialogue is unlikely interrupted in a duration in which the communication is impossible. The interruption of an audio dialogue means the situation where a dialogue unit corresponding to a reply of the user 20 cannot be presented to the user 20 because a corresponding dialogue unit is not stored in the storage unit 108.

Furthermore, for example, it is also possible that the dialogue processing unit 104 selects a predetermined number of dialogue units (pieces of candidate presentation information) sequentially in order of having a higher use frequency, and causes the communication unit 103 to obtain the selected dialogue units.

Figure 8:
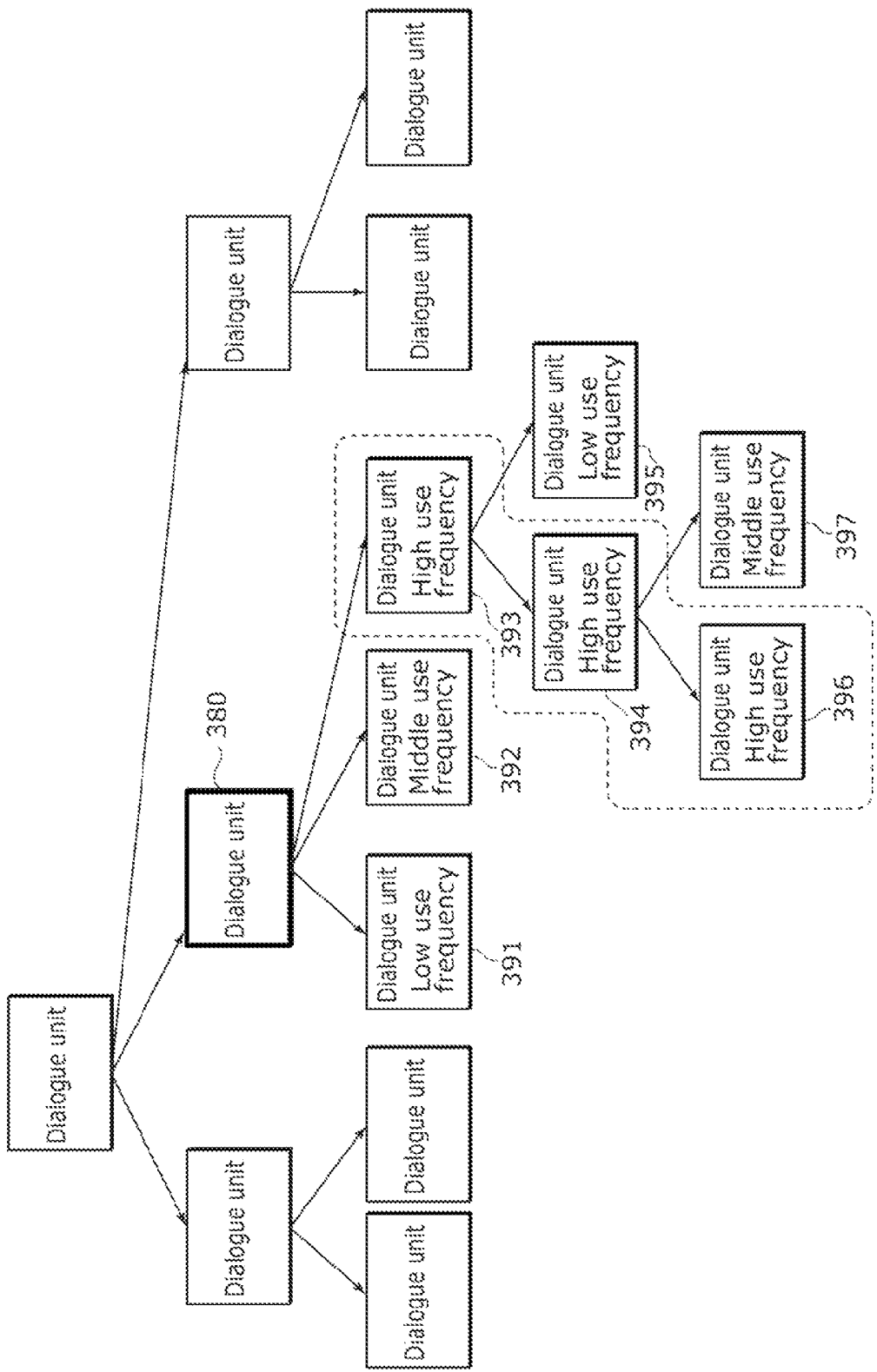
FIG. 8 is a diagram for explaining pieces of pieces of candidate presentation Information selected according to a use frequency.

FIG. 8 is a diagram for explaining pieces of candidate presentation Information selected according to a use frequency. In FIG. 8, in the same manner as FIG. 7, the dialogue unit 380 is a dialogue unit that is currently executed, and dialogue units each including pieces of candidate presentation information are dialogue units 391 to 397.

In FIG. 8, as information indicating a use frequency, the dialogue scenario database 202 of the server 200 stores, for each dialogue unit, history information in which (a) an ID of the dialogue unit and (b) the number of times (use frequency) of having obtained the dialogue unit by the communication unit 103, in association with each other.

For example, if dialogue units are classified into three classes according to a degree of a use frequency, dialogue units belonging to a class of the highest use frequency are dialogue units 393, 394, and 396. Dialogue units belonging to a class of the second highest use frequency are dialogue units 392 and 397. Dialogue units belonging to a class of the lowest use frequency are dialogue units 391 and 395.

Therefore, if the predetermined number of dialogue units to be selected by the dialogue processing unit 104 is three, the dialogue units 393, 394, and 396, which are surrounded by a broken line in FIG. 8, are selected.

As described above, by selecting dialogue units to be cached according to history information, it is possible to decrease a risk that an audio dialogue is interrupted.

It should be noted that the history information may be information indicating a use frequency regarding each individual user 20, or information which includes the number of times or the like of obtainment by other users or other information communication terminals to indicate a general use frequency regarding a plurality of users in audio dialogues using the server 200.

Furthermore, for example, it is also possible that the dialogue processing unit 104 selects a predetermined number of dialogue units (pieces of candidate presentation information) sequentially in order of having a higher use frequency in an area including a position indicated by position information obtained by the position obtainment unit 105, and causes the communication unit 103 to obtain the selected dialogue units.

In this case, the server 200 stores regional history information that indicates a use frequency regarding each piece of presentation information stored in the server 200, for each region in which the piece of presentation information is used. The dialogue processing unit 104 caches dialogue units (pieces of candidate presentation information) based on the regional history information described above and position information obtained by the position obtainment unit 105.

For example, in a tourist site or the like, there is a high possibility that search or the like for famous local restaurants, souvenirs, and the like are instructed to the information communication terminal 100. There is therefore a high possibility that the dialogue processing unit 104 is requested to provide pieces of presentation information regarding such search, and the pieces of presentation information are cached as pieces of candidate presentation information based on the above-described regional history information.

This structure enables the dialogue processing unit 104 to further decrease a risk that an audio dialogue is interrupted.

It should be noted that, the use frequency indicated in the above-described regional history information is a use frequency of using a piece of presentation information by users including users other than the user 20. Therefore, the use frequency is a general use frequency regarding a plurality of users in audio dialogues using the server 200. However, it is also possible that the use frequency indicated in the regional history information is a use frequency regarding each individual user 20.

It should be noted that the history information and the regional history information described above may be stored in the information communication terminal 100, or may be stored in a storage device separated from the server 200 and connectable with the information communication terminal 100 via wires or wirelessly.

It is also possible that the above-described use frequency, data size, and the like are combined and used in determining dialogue units to be selected (pieces of candidate presentation information). For example, it is possible that the dialogue processing unit 104 calculates, for each piece of candidate presentation information, a first evaluation value that is greater as a use frequency of the candidate presentation information is higher and a second evaluation value that is greater as a data amount of the candidate presentation information is smaller, and selects a predetermined number of pieces of candidate presentation information sequentially in order of a larger sum of the first evaluation value and the second evaluation value.

According to Embodiment 1, the information communication terminal 100 is implemented to a vehicle navigation device provided to a movable object as described previously. Therefore, the dialogue processing unit 104 may change the predetermined number of to-be-selected pieces of candidate presentation information according to a speed of the movable object.

More specifically, the dialogue processing unit 104 may cause the communication unit 103 to obtain more pieces of candidate presentation information, as a moving speed of the moving speed is slower.

When a moving speed of the movable object is slow, it is expected that a duration from when the communication unit 103 becomes unable to perform communication until when the communication state of the communication unit 103 is recovered (for example, a duration from when the movable object enters a tunnel until when the movable objects gets out from the tunnel) is long. Therefore, the dialogue processing unit 104 needs to cache a large number of pieces of candidate presentation information to prepare for a response to a reply from the user. On the other hand, if a moving speed of the movable object is fast, it is expected that a duration from when the communication unit 103 becomes unable to perform communication until when the communication state is recovered is short. Therefore, the number of pieces of candidate presentation information to be cached by the dialogue processing unit 104 may be less than the number in the case where the moving speed of the movable object is slow. Therefore, the above-described structure enables the dialogue processing unit 104 to efficiently obtain pieces of candidate presentation information, and thereby further decrease the risk that an audio dialogue is interrupted.

Furthermore, for example, it is also possible that the dialogue processing unit 104 causes the communication unit 103 to obtain more pieces of candidate presentation information as a spare capacity of the storage unit 108 is larger. As a result, the dialogue processing unit 104 can efficiently obtain pieces of candidate presentation information according to a spare capacity of the storage unit 108, and further decrease the risk that an audio dialogue is interrupted.

As described above, the audio dialogue system 10 (information communication terminal 100) according to Embodiment 1 caches pieces of candidate presentation information when the communication state is deteriorated, so that a current dialogue can be continued even if the communication becomes impossible after the caching. As a result, it is possible to reduce stress, confusion, or the like the user feels due to interruption of a dialogue.

Although it has been described in Embodiment 1 that when the communication state determination unit 106 determines that the communication state is deteriorated during an audio dialogue, the dialogue processing unit 104 causes the communication unit 103 to obtain a predetermined number of pieces of candidate presentation information, it is also possible that the dialogue processing unit 104 causes the communication unit 103 to obtain at least one piece of candidate presentation information.

Other Embodiments

The present invention is not limited to the above-described Embodiment 1. The following cases are also included in the present invention.

For example, it is also possible that the communication state determination unit 106 determines that the communication between the communication unit 103 and the server 200 is deteriorated, when BER changes by a smaller temporal change amount than a predetermined temporal change amount to be greater than the first threshold value 400a. For example, it is also possible that the communication state determination unit 106 determines that the communication between the communication unit 103 and the server 200 is impossible, when BER changes by a smaller temporal change amount than the predetermined temporal change amount to be greater than the second threshold value 400. Here, the temporal change amount is an absolute value of inclination of the graph of a temporal change of BER.

Figure 9:
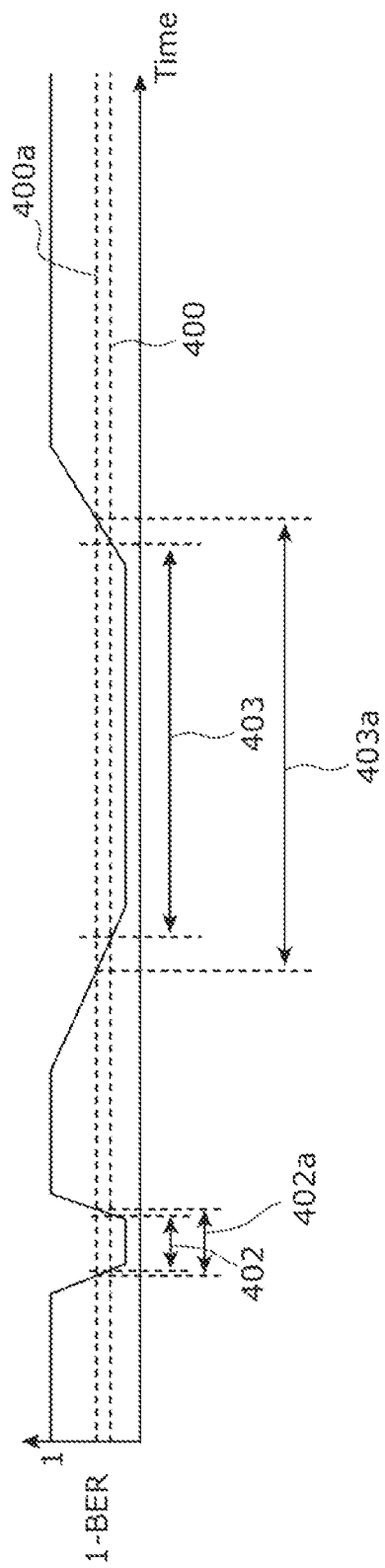
FIG. 9 is a diagram for explaining a method of determining a communication state by a communication state determination unit.

FIG. 9 is a diagram for explaining a method of determining a communication state by the communication state determination unit 106. In FIG. 9, the vertical axis indicates (1-BER).

When BER is drastically increased to exceed the first threshold value 400a, there is a high possibility that the deterioration of the communication state is temporal. In this case, in order to prevent that the communication state determination unit 106 determines that the communication between the communication unit 103 and the server 200 is deteriorated, it may be determined that the communication is deteriorated only when BER changes by a smaller temporal change amount than the predetermined temporal change amount to be greater than the first threshold value 400a.

For example, in period 402a illustrated in FIG. 9, (1-BER) is drastically decreased to be smaller than or equal to the first threshold value 400a. In other words, BER is drastically increased to exceed the first threshold value 400a, and changed by a temporal change amount that is greater than or equal to the predetermined temporal change amount to be greater than the first threshold value 400a. Therefore, the communication state determination unit 106 determines that period 402a is in the state where the communication between the communication unit 103 and the server 200 is possible.

In other words, the communication state determination unit 106 does not determine that period 402a is in the state where the communication between the communication unit 103 and the server 200 is deteriorated.

On the other hand, in period 403a illustrated in FIG. 9, (1-BER) is gradually decreased to be smaller than or equal to the first threshold value 400a. In other words, BER is gradually increased to exceed the first threshold value 400a, and changed by a smaller temporal change amount than the predetermined temporal change amount to be greater than the first threshold value 400a. Therefore, the communication state determination unit 106 determines that period 403a is in the state where the communication between the communication unit 103 and the server 200 is deteriorated (more specifically, period 403 is in the state where the communication is impossible).

Likewise, it is also possible that the communication state determination unit 106 determines whether or not the communication is impossible, by determining whether or not BER changes by a temporal change amount that is greater than or equal to the predetermined temporal change amount to be greater than the second threshold value 400. More specifically, in FIG. 9, the communication state determination unit 106 determines that period 402 is in the state where the communication between the communication unit 103 and the server 200 is possible, and that period 403 is in the state where the communication between the communication unit 103 and the server 200 is impossible.

With the above structure, it is possible to reduce a risk that the communication state is wrongly determined.

It should be noted that the communication state determination unit 106 may determine the communication state beforehand by using communication state information. More specifically, the first determination by the communication state determination unit 106 that the communication state is deteriorated includes determination regarding a current or future communication state. The first determination that the communication state is deteriorated includes that the communication state determination unit 106 is capable of expecting a timing when the communication state is deteriorated and thus determines the timing beforehand.

If the communication state determination unit 106 determines deterioration of the communication state by using communication state information as described above, the information communication terminal 100 estimates a duration until the deterioration of the communication state, based on a current position and a moving speed of the information communication terminal 100, and causes the communication unit 103 to obtain pieces of candidate presentation information when the duration until the deterioration of the communication state becomes shorter than or equal to a predetermined threshold value.

It should also be noted that the information communication terminal 100 does not consist of minimum structural elements only.

Figure 10:
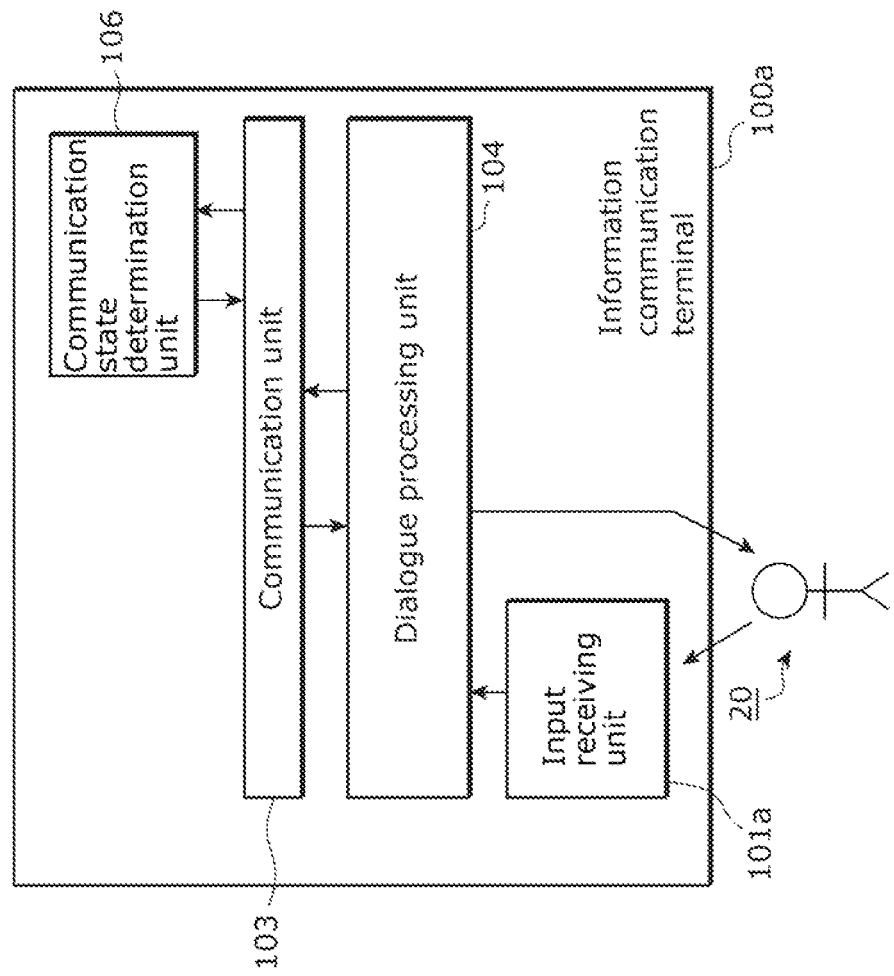
FIG. 10 is a block diagram illustrating an information communication terminal having minimum structural elements.

FIG. 10 is a block diagram illustrating an information communication terminal with minimum structural elements.

As illustrated in FIG. 10, an information communication terminal 100*a* with minimum structural elements includes an input receiving unit 101*a*, a communication unit 103, a dialogue processing unit 104, and a communication state determination unit 106.

Although it has been described in Embodiment 1 that the dialogue processing unit 104 in the information communication terminal 100 and the dialogue processing unit 104 in the information communication terminal 100*a* present Information by sound, the method of presenting information to the user is not limited to this example. For example, it is possible that the information communication terminal further includes a display unit that displays image, that the dialogue processing unit 104 in the information communication terminal 100 presents image to the user by displaying image on the display unit, and that the dialogue processing unit 104 in the information communication terminal 100*a* presents predetermined first information to the user by displaying image on the display unit.

In the above case, the display unit is, for example, a liquid crystal display, a plasma display, or an organic Electro Luminescence (EL) display, or the like. Furthermore, when the information communication terminal is implemented to a vehicle navigation device as described in Embodiment 1, a Head Up Display (HUD) using a front glass of a vehicle may be used as the display unit.

In this case, the information presented by the dialogue processing unit 104 in the information communication terminal 100 and the dialogue processing unit 104 in the information communication terminal 100*a* may be still images only. In other words, a dialogue between the user and the information communication terminal is not necessarily an audio dialogue. Furthermore, information presented by the dialogue processing unit 104 in the information communication terminal 100 and the dialogue processing unit 104 in the information communication terminal 100*a* may be video generated by combining sound and images.

Moreover, although it has been described in Embodiment 1 that the information communication terminal obtains speech of the user, the input from the user to the information communication terminal is not necessarily a speech. In other words, the information communication terminal may include an input receiving unit and performs dialogue processing based on an input from the user. In this case, the input receiving unit may be anything that can receive inputs from the user.

For example, the input receiving unit may be the speech obtainment unit and the speech recognition unit as described in Embodiment 1, or a touch panel capable of receiving touch operations of the user, a hard switch, or the like.

Figure 11:
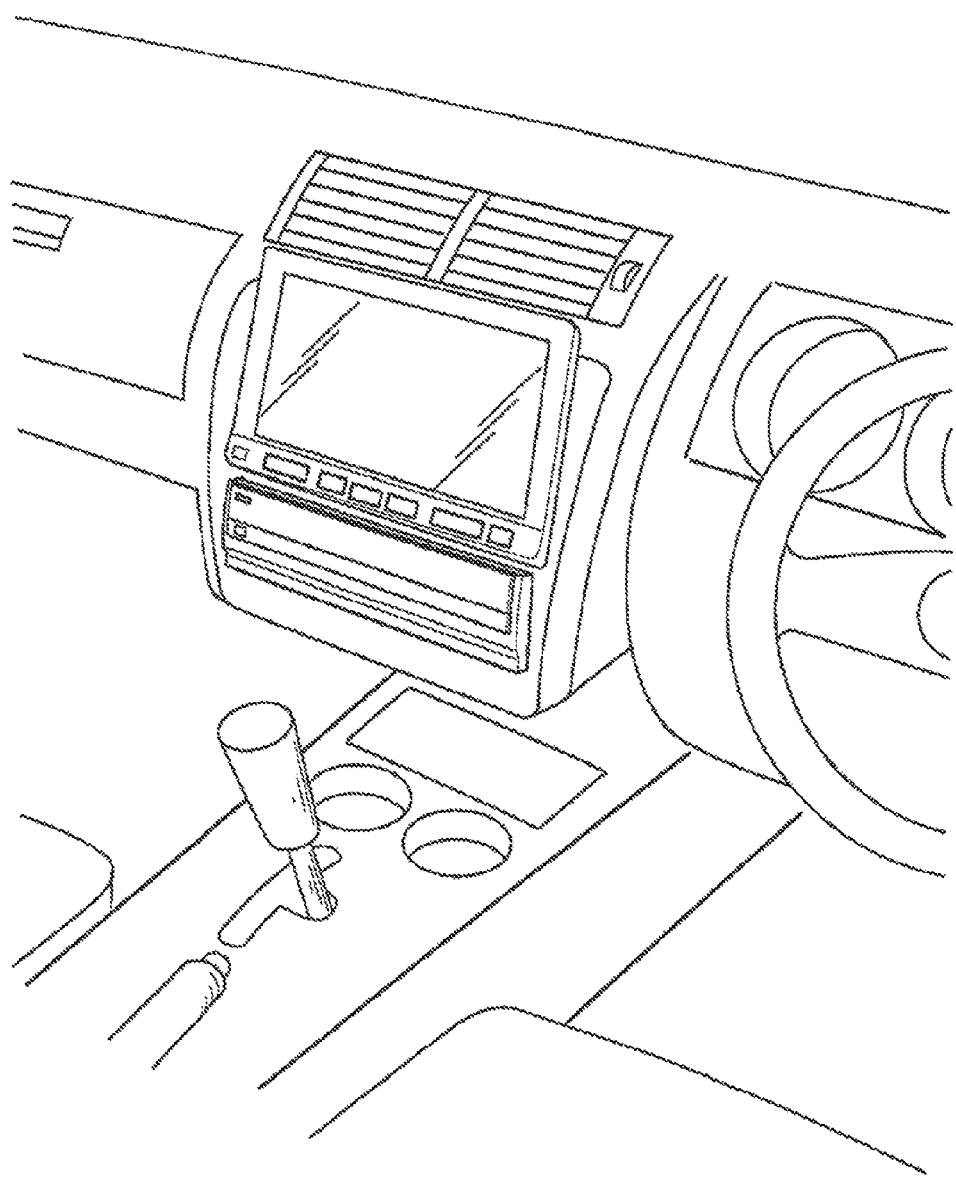
FIG. 11 is a diagram illustrating an example of the application of the information communication terminal.

Although it has been described in Embodiment 1 that the information communication terminal is implemented to a vehicle navigation device as illustrated in FIG. 11, the information communication terminal may be implemented to a smartphone or a tablet terminal.

It should be noted that the present invention may be implemented to the server 200 that provides pieces of presentation information (dialogue units). In other words, a part or all of the functions of the dialogue processing unit 104 may be implemented to the functions of the server 200 (server dialogue processing unit 204).

In the general dialogue processing, the server 200 transmits presentation information corresponding an information obtainment request to the information communication terminal 100 according to the dialogue scenario, every time the information obtainment request is received from the information communication terminal 100 operated by the user 20. In other words, the presentation information is transmitted according to the received information obtainment request and the dialogue scenario.

Here, if the communication state determination unit 106 determines that the communication state is deteriorated, the dialogue processing unit 104 of the information communication terminal 100 transmits an information obtainment request including communication deterioration information to the server 200 (server communication unit 203) via the communication unit 103. The communication deterioration information is information indicating that the communication state between the server 200 and the information communication terminal 100 is deteriorated.

When an information obtainment request including communication deterioration information is received, the server 200 transmits, to the information communication terminal 100, at least one piece of candidate presentation information that is a piece of presentation information subsequent in the presentation order according to the dialogue scenario to a piece of presentation information already transmitted to the information communication terminal 100.

With the above structure, the communication deterioration information can trigger selection of candidate presentation information by the server 200. In other words, the above-described method of selecting the candidate presentation information by the information communication terminal 100 may be applied to the server 200.

For example, it is possible that, when the server 200 receives an information obtainment request including communication deterioration information, the server 200 selects a predetermined number of pieces of candidate presentation information sequentially following in the presentation order the presentation information transmitted to the communication unit 103 immediately prior to the reception of the information obtainment request including the communication deterioration information, and transmits the selected pieces of candidate presentation information to the communication unit 103.

It is also possible, for example, that the server 200 holds history information indicating a use frequency regarding each of pieces of presentation information stored in the server 200, and when the server 200 receives an information obtainment request including communication deterioration information, the server 200 selects a predetermined number of pieces of candidate presentation information sequentially in order of having a higher use frequency based on the history information, and transmits the selected pieces of candidate presentation information to the communication unit 103.

As described above, the selection of pieces of candidate presentation information by the server 200 allows the information communication terminal 100 to perform only transmission of an information obtainment request and communication deterioration information, so that there are advantages of simplifying the processing performed by the information communication terminal 100.

Furthermore, the determination regarding the communication state may be made by the server 200. In other words, it is also possible that, when the server 200 determines deterioration of the communication state, the server 200 selects pieces of candidate presentation information and transmits them to the communication unit 103. It is thereby possible to simplify the processing performed by the information communication terminal 100.

In addition, the following cases are also included in the present invention.

(1) Each of the above-described devices in the audio dialogue system, such as the information communication terminal and the server, is a computer system including a microprocessor, a Read Only Memory (ROM), a Random Access Memory (RAM), a hard disk unit, a display unit, a keyboard, a mouse, and the like. The RAM or the hard disk unit holds a computer program. The microprocessor operates according to the computer program, thereby causing each of the above-described devices to perform its functions. Here, the computer program consists of combinations of instruction codes for issuing instructions to the computer to execute predetermined functions.

(2) A part or all of the structural elements included in each of the above-described devices may be implemented into a single Large Scale Integration (LSI). The system LSI is a super multi-function LSI that is a single chip into which a plurality of structural elements are integrated. More specifically, the system LSI is a computer system including a microprocessor, a ROM, a RAM, and the like. The ROM holds a computer program. The microprocessor loads a computer program from a ROM to a RAM, and operates calculations and the like according to the loaded computer program to cause the system LSI to perform its functions.

(3) It should also be noted that a part or all of the structural elements included in each of the devices according to the above embodiments may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor operates according to the computer program to cause the IC card or the module to perform its functions. The IC card or the module may have tamper resistance.

(4) The present invention may be the above-described method. The present invention may be a computer program causing a computer to execute the method, or digital signals indicating the computer program.

It should also be noted that the present invention may be a computer-readable recording medium on which the computer program or the digital signals are recorded. Examples of the computer-readable recording medium are a flexible disk, a hard disk, a Compact Disc (CD)-ROM, a magnetooptic disk (MO), a Digital Versatile Disc (DVD), a DVD-ROM, a DVD-RAM, a BD (Blu-Ray® Disc), and a semiconductor memory. The present invention may be digital signals recorded on the recording medium.

It should also be noted in the present invention that the computer program or the digital signals may be transmitted via an electric communication line, a wired or wireless communication line, a network represented by the Internet, data broadcasting, and the like.

It should also be noted that the present invention may be a computer system including a microprocessor operating according to the computer program and a memory storing the computer program.

It should also be noted that the program or the digital signals may be recorded onto the recording medium to be transferred, or may be transmitted via a network or the like, so that the program or the digital signals can be executed by a different independent computer system.

(5) It should also be noted that the above-described embodiments may be combined.

Although the information communication terminal according to one or more aspects of the present invention has been described based on the embodiments, the present invention is not limited to these embodiments. Those skilled in the art will be readily appreciate that various modifications and combinations of the structural elements in the embodiments are possible without materially departing from the novel teachings and advantages of the present invention. Accordingly, all such modifications and combinations are intended to be included within the scope of the present invention.

INDUSTRIAL APPLICABILITY

The present invention is useful as an information communication terminal used in vehicle navigation devices.

REFERENCE SIGNS LIST 10 audio dialogue system
20 user
100, 100a information communication terminal
101 speech obtainment unit
101a input receiving unit
102 speech recognition unit
103 communication unit
104 dialogue processing unit
105 position obtainment unit
106 communication state determination unit
108 storage unit
109 speed obtainment unit
110 audio output unit
111 audio synthesis unit
200 server
202 dialogue scenario database
203 server communication unit
204 server dialogue processing unit
300 wireless communication line
301-305, 311-316, 321, 322, 401a, 402, 402a, 403a, 403, 404a period
380, 391-397 dialogue unit
400 second threshold value
400a first threshold value

The invention claimed is:

1. An information communication terminal that communicates with a server holding a dialogue scenario and history information via a communication network and conducts a dialogue with a user according to the dialogue scenario, the dialogue scenario indicating a presentation order for pieces of presentation information, and the history information indicating a use frequency of each of the pieces of the presentation information, the information communication terminal comprising:
- an input receiving unit configured to receive an input by the user in the dialogue;
- a communication unit configured to obtain, from the server via the communication network, a piece of the presentation information corresponding to the input by the user according to the dialogue scenario, every time the input receiving unit receives the input by the user;
- a dialogue processing unit configured to present the user with the piece of the presentation information obtained by the communication unit, as a response of the information communication terminal to the user in the dialogue; and
- a communication state determination unit configured to determine a communication state of communication between the communication unit and the server,
- wherein the dialogue processing unit is configured to, when the communication state determination unit determines that the communication state is deteriorated during the dialogue, cause the communication unit to obtain, as a predetermined number of pieces of candidate presentation information, a predetermined number of pieces of the presentation information sequentially in order of having a higher use frequency based on the history information, the predetermined number of pieces of the presentation information being arranged subsequent in the presentation order according to the dialogue scenario to the piece of the presentation information presented to the user at a time when it is determined that the communication state is deteriorated.

2. The information communication terminal according to claim 1,
wherein the information communication terminal is provided to a movable object, and
the information communication terminal further comprises a speed obtainment unit configured to obtain a moving speed of the movable object as a moving speed of the information communication terminal, and
when the communication state determination unit determines that the communication state is deteriorated during the dialogue, the dialogue processing unit is configured to cause the communication unit to obtain more pieces of the candidate presentation information as the moving speed is slower.

3. The information communication terminal according to claim 1, further comprising
a storage unit configured to hold the predetermined number of pieces of candidate presentation information which has been obtained by the communication unit, and
when the communication state determination unit determines that the communication state is deteriorated during the dialogue, the dialogue processing unit is configured to cause the communication unit to obtain more pieces of candidate presentation information as the storage unit has a larger spare capacity.

4. The information communication terminal according to claim 1,
wherein the communication state determination unit is configured to determine that the communication state is deteriorated, when a Bit Error Rate (BER) of a signal in the communication between the communication unit and the server is greater than a first threshold value.

5. The information communication terminal according to claim 4,
wherein the communication state determination unit is configured to determine that the communication state is deteriorated, when the BER changes by a smaller temporal change amount than a predetermined temporal change amount, to be greater than the first threshold value.

6. The information communication terminal according to claim 1, further comprising:
a position obtainment unit configured to obtain position information indicating a current position of the information communication terminal; and
a storage unit configured to hold communication state information in which a position of the information communication terminal and the communication state determined at the position are associated with each other,
wherein the communication state determination unit is configured to determine that the communication state is deteriorated, based on the position information and the communication state information.

7. The information communication terminal according to claim 6,
wherein the communication state information is a history of the communication state, in which the position indicated in the position information that has been obtained by the position obtainment unit and a determination result of the communication state that has been determined at the position by the communication state determination unit are associated with each other.

8. The information communication terminal according to claim 1, further comprising
an audio output unit configured to output sound,
wherein the dialogue processing unit is configured to cause the audio output unit to output sound to present the user with the piece of the presentation information which is obtained by the communication unit.

9. The information communication terminal according to claim 1, further comprising
a display unit configured to display image,
wherein the dialogue processing unit is configured to cause the display unit to display image to present the user with the piece of the presentation information which is obtained by the communication unit.

10. The information communication terminal according to claim 1,
wherein the input receiving unit includes:
a speech obtainment unit configured to obtain a speech of the user as the input by the user; and
a speech recognition unit configured to recognize the speech of the user which is obtained by the speech obtainment unit,
wherein the communication unit is configured to obtain, from the server, the piece of the presentation information which corresponds to a result of the recognition of the speech of the user according to the dialogue scenario, every time the speech recognition unit recognizes the speech of the user.

* * * * *